United States Patent [19]

Takahashi et al.

[11] 3,855,897
[45] Dec. 24, 1974

[54] METHOD OF PROTECTING A BUNDLE OF FLEXIBLE OPTICAL FIBERS

[76] Inventors: Nagashige Takahashi, No. 80, Nishimachi Kokubunjishi; Teruo Oouchi, No. 2-1-11, Kotobukicho, Fuchu-shi, both of Tokyo, Japan

[22] Filed: June 5, 1972

[21] Appl. No.: 259,484

Related U.S. Application Data

[62] Division of Ser. No. 875,836, Nov. 12, 1969, Pat. No. 3,691,001.

[52] U.S. Cl. .................... 87/1, 156/148, 156/160, 156/294
[51] Int. Cl. .................... B29d 11/00, G02b 5/16
[58] Field of Search ............. 87/1, 8; 156/148, 149, 156/160–164, 166, 176, 229, 294

[56] References Cited
UNITED STATES PATENTS

| | | | |
|---|---|---|---|
| 2,284,728 | 6/1942 | Dreyfus | 87/1 |
| 2,500,332 | 3/1950 | Whitehead | 87/1 |
| 3,048,078 | 8/1962 | Kaplan | 87/1 |
| 3,249,666 | 5/1966 | French | 156/149 X |
| 3,253,619 | 5/1966 | Cook | 156/149 X |
| 3,368,017 | 2/1968 | Lister | 156/149 X |
| 3,457,962 | 7/1969 | Shobert | 156/148 X |

*Primary Examiner*—John Petrakes
*Attorney, Agent, or Firm*—Hans Berman

[57] ABSTRACT

A bundle of flexible optical fibers for an endoscope is protected by inserting the bundle axially into a tubular braid of intertwined filaments extending about the tube axis in a right-handed and left-handed helix respectively, thereafter axially stretching the tube so as to increase the pitch of each helix and to decrease the diameter of the braid until it compresses the inserted bundle, impregnating the stretched tube with liquid synthetic resin composition, and solidifying the composition.

5 Claims, 10 Drawing Figures

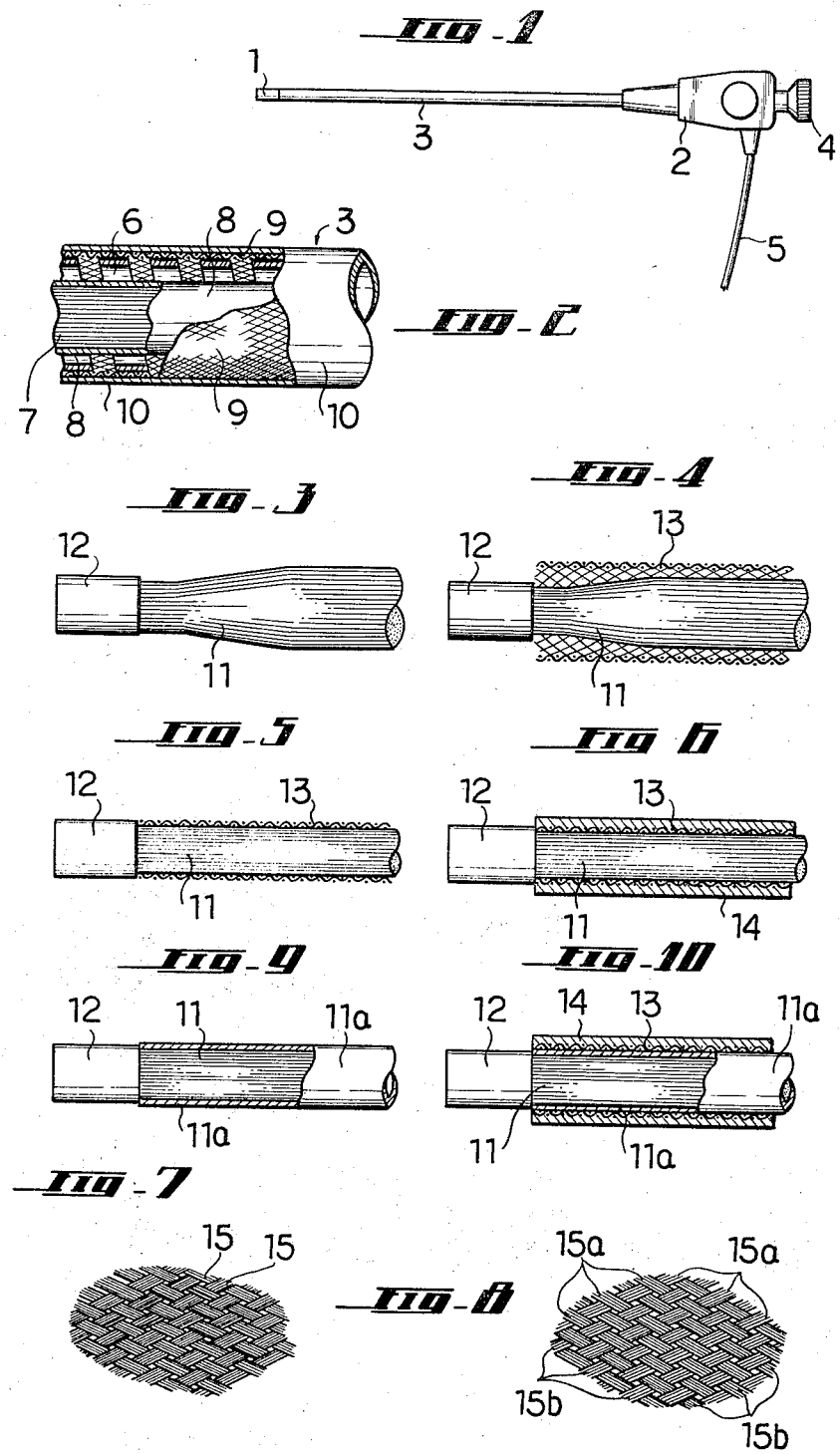

METHOD OF PROTECTING A BUNDLE OF FLEXIBLE OPTICAL FIBERS

This application is a division of the copending application Ser. No. 875,836, filed on Nov. 12, 1969, now U.S. Pat. No. 3,691,001.

This invention relates to endoscopes, and particularly to a method of protecting a bundle of flexible optical fibers to form the flexible tube of an endoscope.

An endoscope of the flexible type has a control housing and a flexible tube which connects the control housing to a forward end member. The latter is inserted into a body cavity during use of the endoscope, and an image of an object in the body cavity is projected by an objective lens in the end member on one transverse end face of a bundle of parallel optical fibers thin enough to make the bundle flexible. The fibers extend through the tube to the control housing, and the image may be viewed on the other end face of the bundle by means of an ocular on the control housing. Light may be transmitted from a light source near the control housing to the forward end member through another bundle of optical fibers to illuminate the object.

It is necessary to protect the optical fibers in the flexible tube against moisture and mechanical damage, and the combined cross section of the fibers and of the protecting structure must not exeed the cross section of the body opening through which the endoscope is to be inserted. A strong protective structure was available heretofore only for a relatively thin fiber bundle providing lower resolution and transmitting less light than a thicker bundle of otherwise identical fibers.

It is the primary object of the invention to provide a method of protecting a bundle of flexible optical fibers for an endoscope by a flexible sheath which combines small thickness with high mechanical strength and which can be prepared in a simple manner.

With this object and others in view, as will presently become apparent, the fiber bundle to be protected according to this invention is loosely enveloped by a tubular braid of intertwined filaments extending about the tube axis in a right-handed and left-handed helix respectively. The braid thereafter is stretched axially to increase the pitch of each helix and to decrease the inner diameter of the tube until it exerts radial pressure on the inserted bundle. The stretched braid is impregnated with synthetic resin composition in the liquid condition, and the resin composition then is solidified.

Other features of this invention and many of the attendant advantages will readily become apparent from the following detailed description of preferred embodiments when considered in connection with the appended drawing in which:

FIG. 1 shows an endoscope in which the bundle of optical fibers protected according to this invention is to be used the view being in side elevation, FIG. 2 is a fragmentary, side-elevational view, partly in section, of a conventionally protected optical fiber bundle on a scale much larger than that of FIG. 1;

FIG. 3 illustrates one longitudinal end of a fiber bundle to be protected according to the invention in side-elevational view on the approximate scale of FIG. 2;

FIGS. 4 to 6 show sequential stages in the method of protecting the fiber bundle of FIG. 3;

FIG. 7 shows a detail of a tubular braid employed in the method of the invention;

FIG. 8 shows a modified braid in the manner of FIG. 7;

FIG. 9 shows the fiber bundle of FIG. 3 provided with an intermediate cover; and FIG. 10 shows the final stage of protecting the bundle of FIG. 9 in the manner illustrated in FIGS. 4 to 6.

The endoscope, conventional as far as shown in FIG. 1, has a forward end member 1 equipped with non-illustrated viewing and illuminating windows for throwing light on an object and for viewing the illuminated object. The forward end member 1 is connected with a control housing 2 by a flexible tube 3 enclosing the optical fiber bundle with which this invention is more specifically concerned. An ocular 4 on the control housing permits visual inspection support bar the illuminated object, and the light conducting system 5 for illuminating the object partly extends outward of the control housing toward a non-illustrated light source.

As is shown in FIG. 2, it was customary heretofore to wind a metallic strip 6 loosely about the image-transmitting bundle 7 of optical fibers enclosed in a thin walled tube 8 of synthetic resin composition. Twisting of the strip 6 and significant changes in its length and diameter are prevented by a tubular braid 9 which envelops the metal strip 6 and is itself enveloped by a plastic covering tube 10 which seals the entire structure and provides the outer skin of the flexible tube 3. As is inherent in the multiple layers of protecting material, only a very small cross-sectional portion of the flexible tube 3 is available for the bundle 7 of optical fibers, and an endoscope having a flexible tube of the type shown in FIG. 2 cannot be made thin enough for inspecting the bronchi, the biliary ducts, and similar narrow body passages.

According to the invention, a flexible tube for use between the forward end part 1 and the control housing 2 is constructed in steps illustrated in FIGS. 3 to 6. Only the forward end of the fiber bundle 11 is shown in FIG. 3. It carries a lens barrel 12 of an objective lens, not itself visible, as is conventional in itself.

The bundle 11 is inserted axially into a tubular braid 13 having intial dimensions such as to loosely envelop the inserted bundle 11, only the lens barrel 12 projecting from the braid 13, as is seen in FIG. 4. While the longitudinal or axial relationship of the lens barrel 12 and the braid 13 is maintained, the latter is stretched axially so that it contracts transversely to its axis and exerts enough radial pressure on the bundle 11 to compress the bundle, the resulting structure being seen in FIG. 5. The device of FIG. 5 is thereafter dipped in a synthetic resin composition based on polyurethane or polyamide resin so that a layer 14 of the composition impregnates and covers the braid 13, while keeping the lens barrel 12 exposed. When the resin composition solidifies or sets, the finished flexible tube partly illustrated in FIG. 6 is obtained. The sheath provided by the impregnated braid 13 is fluid-tight and sufficiently flexible. Known methods other than dipping may be employed for impregnating the braid 13.

The tubular braid 13 essentially consists of two sets of filaments, each filament of one set extending about the axis of the braid in a right-handed helix, while each filament of the other set defines a left-handed helix and thus intersects the helix of each filament of the first-mentioned set. Stretching the braid 13, as described above, causes the pitch of each helix to be increased while its diameter is decreased.

As is shown in greater detail in FIG. 7, the filaments constitute groups 15 of closely juxtaposed, parallel filaments, and the groups of right-handed, helical filaments and of left-handed, helical filaments are intertwined or interwoven. The filaments may consist of non-metallic fibrous material, such as cotton or silk, or of metal. The non-metallic materials mentioned bond well to the impregnating synthetic resin composition, but have relatively low mechanical strength, particularly compressive strength. The metallic filaments have superior mechanical strength, but do not bond firmly to the impregnating resin material.

The advantages of both types of material are combined in the braid structure illustrated in FIG. 8 in which groups 15a of metallic filaments alternate in each set transversely to the direction of filament elongation with groups 15b of non-metallic filaments.

If so desired, the bundle 11 may be enclosed in a thin-walled, flexible plastic tube 11a, preferably of silicone resin, prior to being inserted in the braid 13, as is shown in FIG. 9, so that the sheath of the completed flexible tube illustrated in FIG. 10 consists of an inner tubular layer of silicone resin enveloped tightly by the stretched braid 13 impregnated with flexible, solid resin composition 14. A non-illustrated lubricating liquid or powder may be interposed between the tube 11a and the bundle 12 to increase the useful life of the optical fibers.

The protective sheath of the invention has the desired flexibility combined with little longitudinal resiliency, and is much thinner than a conventional sheath offering comparable protection to the optical fibers.

What is claimed is:

1. A method of protecting an elongated bundle of flexible optical fibers which comprises:
   a. loosely enveloping said bundle with a tubular braid of intertwined filaments, the braid having an axis and the enveloped bundle being elongated in the direction of said axis;
   b. axially stretching said braid until it contracts transversely to said axis and exerts radial pressure on said bundle;
   c. impregnating the contracted braid with a liquid synthetic resin composition; and
   d. solidifying said composition while maintaining said braid in the contracted condition.

2. A method as set forth in claim 1, wherein said braid includes two sets of filaments, each filament of one set extending about said axis in a right-handed helix, and each filament of the other set extending about said axis in a left-handed helix, the helix of each filament in one set intersecting the helix of each filament in the other set, the pitch of each helix being increased by said stretching and the diameter thereof being reduced.

3. A method as set forth in claim 2, wherein said bundle is axially inserted into said tubular braid until enveloped by the same.

4. A method as set forth in claim 2, wherein each set of filaments includes a plurality of groups of filaments, the filaments of each group being parallel and closely juxtaposed and intertwined jointly with groups of filaments of the other set.

5. A method as set forth in claim 4, wherein groups of filaments alternating in at least one of said sets transversely to the direction of filament elongation consist of metallic and non-metallic filaments respectively.

* * * * *

UNITED STATES PATENT OFFICE
CERTIFICATE OF CORRECTION

Patent No. 3,855,897            Dated December 24, 1974

Inventor(s) NAGASHIGE TAKAHASHI ET AL

It is certified that error appears in the above-identified patent and that said Letters Patent are hereby corrected as shown below:

In the heading, after line [76] insert --

[73] Assignee: Olympus Optical Co., Ltd.,
              Tokyo, Japan   -- after line [21] insert --

[30]      Foreign Application Priority Data

November 14, 1968  Japan ............... 83465/1968
    November 14, 1968  Japan ............... 99327/1968  --

Signed and sealed this 6th day of May 1975.

(SEAL)
Attest:

RUTH C. MASON
Attesting Officer

C. MARSHALL DANN
Commissioner of Patents
and Trademarks